United States Patent [19]

Leenaards

[11] 4,026,422
[45] May 31, 1977

[54] PALLETIZING APPARATUS WITH MEANS FOR FORMING LAYER OF ARTICLES

[75] Inventor: Antoine Joseph Leenaards, Lausanne, Switzerland

[73] Assignee: Crown Cork & Seal Company, Inc., Philadelphia, Pa.

[22] Filed: Dec. 23, 1975

[21] Appl. No.: 643,901

Related U.S. Application Data

[63] Continuation of Ser. No. 390,798, Aug. 23, 1973, abandoned.

[30] Foreign Application Priority Data

Aug. 29, 1972 Belgium .............................. 788123

[52] U.S. Cl. ................................ 214/6 P; 198/374; 198/436
[51] Int. Cl.² ................... B65G 57/00; B65G 47/26
[58] Field of Search ........................ 214/6 P, 6 R; 198/31 AB, 235, 374, 436

[56] References Cited

UNITED STATES PATENTS

| | | | |
|---|---|---|---|
| 3,050,199 | 8/1962 | McGrath et al. | 214/6 P |
| 3,294,257 | 12/1966 | Davies et al. | 214/6 P |
| 3,432,045 | 3/1969 | Bauer | 214/6 P |
| 3,522,890 | 8/1970 | Birchall | 214/6 P |

*Primary Examiner*—L. J. Paperner
*Assistant Examiner*—Ross Weaver
*Attorney, Agent, or Firm*—Woodcock Washburn Kurtz & Mackiewicz

[57] ABSTRACT

Packages are moved from an input conveyor in an input section onto moving rollers in a row-forming section. As the packages move forward on the rollers, a distributing device moves laterally with respect to the motion of the packages on the rollers so as to selectively position the packages in rows. Turning means are placed in the path of the packages as they advance on the rollers to rotate the packages with respect to one another. The rows collect on the rollers and are then moved to a stacking section where they are palletized. Transversely extending bars are provided to control the movement of the rows through the row forming section and the stacking section.

6 Claims, 3 Drawing Figures

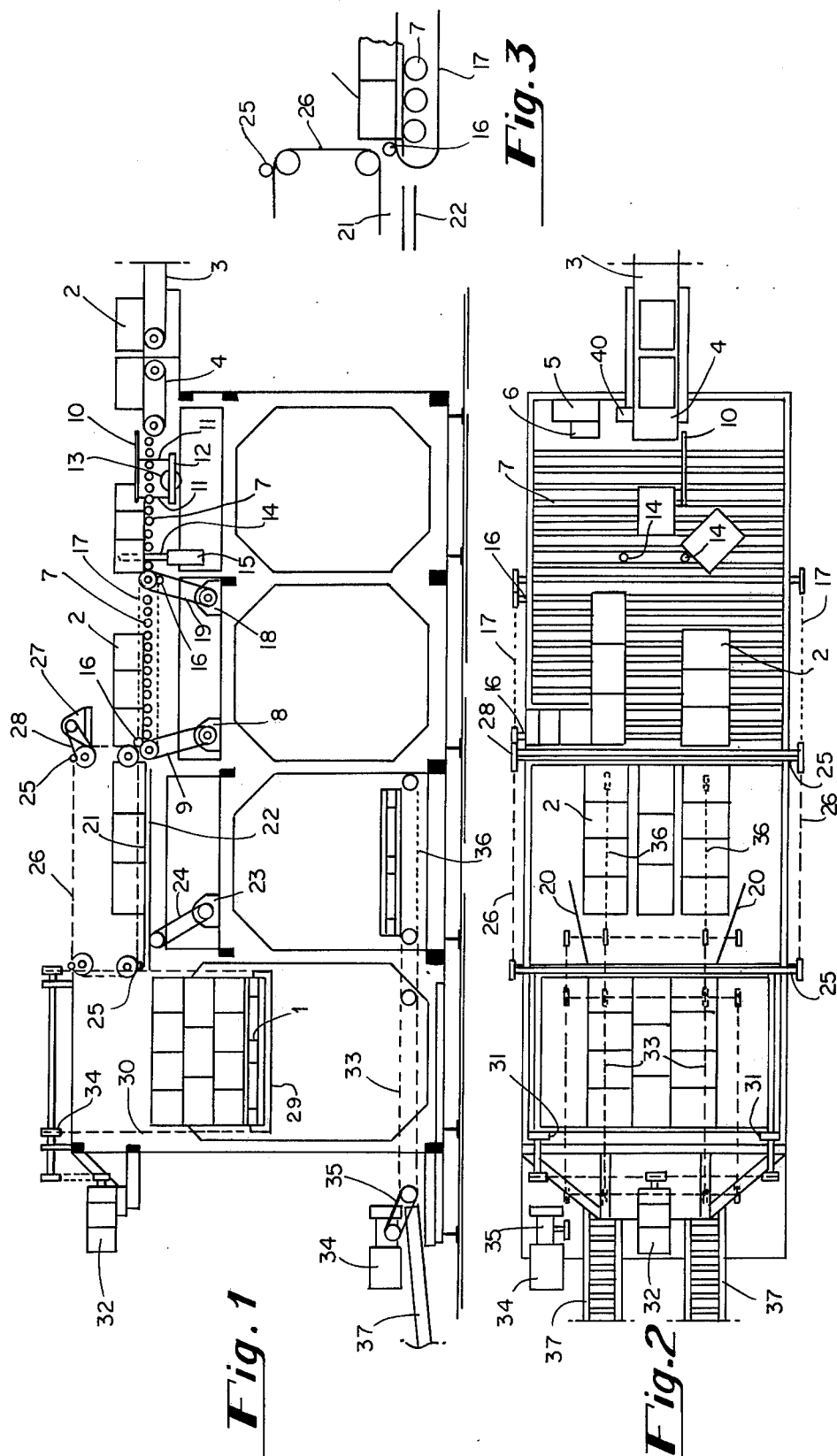

PALLETIZING APPARATUS WITH MEANS FOR FORMING LAYER OF ARTICLES

This is a continuation, of application Ser. No. 390,798, filed Aug. 23, 1973, now abandoned.

BACKGROUND OF THE INVENTION

The present invention relates to a palletizing apparatus for stacking horizontal rows of packages such as packing cases, boxes or the like on a pallet.

Many prior art palletizers are of the type which form a single line of packages at a time as they come out of an input conveyor. These single rows of packages may be formed on a set of rollers and the individual rows of packages so formed may be transversely scaped from the set of rollers before being pushed onto a pallet in a stacking section.

The prior art palletizers which form a single line of packages in this way have the drawback that they are relatively slow in operation and have a low capacity for stacking packages. Indeed, the formation of a single row of packages on a set of rollers makes it necessary to stop the input conveyor and to interrupt the operation of the palletizer each time a row is completed, especially when the row is to be scraped off transversely. In addition, in the instance of stacking packages, certain of which are aligned at right angles with respect to the others, these prior art palletizers require the use of a suitable bevel gear which constitutes, not only an onerous additional device, but also causes a slowing down of the operation of the palletizing apparatus.

The object of the invention is new palletizing apparatus capable of forming several parallel rows of packages so as to have a substantially greater capacity for stacking packages than the prior art without consuming more power.

In a preferred embodiment of the invention, the palletizing apparatus stacks successive horizontal rows of packages such as packing cases, boxes and the like. The input section includes an input conveyor successively conveying packages. A row forming section includes rollers or other conveyor means communicating with the input conveyor for forming rows of packages received from the input conveyor. First bar means extend transversely across the row forming section for stopping the conveyance of the rows on the rollers while also pushing and discharging the rows formed on the rollers into the stacking section of the apparatus.

In accordance with this invention, a retractable distributing device moves laterally over the surface of the rollers so as to selectively push packages laterally with respect to the path of those packages leaving the input conveyor thereby forming a plurality of rows on the rollers of the input section. The rows so formed may then be moved forward by the transversely extending bar means into the stacking section. The retractable distributing device may comprise a horizontal bar which extends longitudinally along the path of the articles leaving the input conveyor and above the rollers. The bar may be supported by at least one support member which extends upwardly between a pair of rollers and is actuated in response to motor drive means.

In accordance with another important aspect of the invention, at least one retractable turning device is provided in the input section for turning packages at right angles. This device may comprise a bar or member which extends vertically between a pair of rollers and engages a package near or at a corner as the package moves along the rollers toward the transversely extending bar. Retraction of the turning device is accomplished by motor means located beneath the rollers as, for example, a hydraulic jack.

In order to permit the input section to function substantially independently of the movement of the pallet on the elevator in the stacking section, the stacking section includes a fixed support plate in communication with the rollers and a movable support plate which may be displaced horizontally from a position beneath the fixed support plate to a position above the pallet. At least one second transverse bar means is provided for moving packages on the fixed support plate onto the movable support plate. The second transverse bar means has a dual function of pushing the rows of packages from the fixed support plate onto the movable support plate when the movable support plate is in the forward position while also scraping the packages from the movable support plate when the movable support plate is retracted to a position beneath the fixed support plate.

The first transverse bar means and the second transverse bar means may each comprise a pair of transversely extending bars which are mounted on endless chains. The endless chains of the first transversely extending bars of the input section may be disposed both above and below the rollers so as to locate one of the first transverse bars in contact with the packages at the front of the row forming section and the other of the first transverse bars below the rollers and behind the rows so as to permit the one transverse bar above the rollers to stop the packages while the other transverse bar below the rollers may be used to push or scrape the rows of packages off the rollers and onto the fixed support plate in the stacking section when the chains supporting the first transverse bars are advanced. The chains supporting the second transverse bars are located above the fixed support plate with one transverse bar being located in a position at the rear of the fixed support plate and above the path of the packages as they are moved onto the fixed support plate with the other of the second transverse bars being located at the front of the fixed support plate and in the path of the packages as they are moved from the rollers onto the fixed support plate. After the movable support plate has been moved to a position forward of the fixed support plate and above the pallet, the chains supporting the second transverse bars are moved so as to bring the bar at the rear of the fixed support plate into contact with the packages on the plate while moving the bar at the front of the plate out of the path of the packages thereby permitting the packages to move onto the movable support plate.

In accordance with another object of this invention, the palletizing apparatus may be automated by the use of a photoelectric cell which is actuated by the packages emerging from the input conveyor. Pulses from the photoelectric cell are applied to a programmed control means which is utilized to control the position of the distributor and return devices as well as the movement of the rollers, movement of the transverse bars, and movement of the pallet elevator.

Other details and particulars of this invention will appear from the description of the accompanying drawings which illustrate the embodiment of the invention in a schematic and purely exemplary way.

BRIEF DESCRIPTION OF THE DRAWING

FIG. 1 is an elevational view of an embodiment of the palletizing apparatus according to the invention;

FIG. 2 is a top plan view of the palletizing apparatus of FIG. 1; and

FIG. 3 is an enlarged view of a portion of the apparatus shown in FIG. 1.

In these various figures, similar reference numerals refer to identical parts.

DETAILED DESCRIPTION OF A PREFERRED EMBODIMENT

The palletizing apparatus shown serves to stack onto a pallet 1 successive horizontal rows of packages 2 such as packing cases, boxes or the like.

Generally, the palletizing apparatus, successively includes an input section for packages 2, a section serving for the formation of several parallel rows of packages 2 and a section for stacking the row of packages 2 onto the pallet 1.

The palletizing apparatus receives the packages 2 to be stacked from an endless belt feed conveyor 3.

The input section for the packages 2 comprises an endless belt input conveyor 4, e.g., driven by an electrical motor 5 through transmission means 6. The input conveyor 4 directly receives the packages 2 from the feed conveyor 3 and brings them successively forward causing them to pass in front of a photoelectric cell whose function will be explained hereafter.

The section serving for the formation of rows of packages 2 comprises a set 7 of horizontal and transverse rollers rotating simultaneously in synchronism and at the same speed under the action of an electrical motor 8 and through transmission means 9. The set 7 of rollers or a similar transport means successively receives after one another the packages 2 coming from the input conveyor 4.

The packages 2 successively fed on the set 7 of rollers are first treated by a retractable distributing device made for example by a longitudinal and horizontal distributing bar 10. The distributing bar 10 is mobile transversely or laterally and in a parallel direction to the rollers of the set 7 above the latter. The distributing bar 10 pushes laterally and selectively the packages 2 of the set 7 of rollers to form at least two, and in this example, three parallel longitudinal rows of packages 2. For that purpose, the distributing bar 10 extending above the set 7 of rollers is mounted, for example, on two vertical supporting rods 11 transversely and simultaneously movable between two distinct pairs of successive rollers of the set 7. The supporting rods 11 are connected at their lower ends by means of a brace 12 displaceable horizontally below the set 7 of rollers under the action of a motor member formed by hydraulic jack 13.

After having been distributed transversely or laterally by the distributing device, the packages 2 are selectively subjected to a retractable turning device comprising for example two vertical bars 14 acting above the set 7 of rollers. Both turning bars 14 are respectively relating to both end rows of packages 2. Both turning bars 14 pass between the same two rollers of the set 7. Each turning bar 14 is displaceable axially, thus vertically and independently of the other. Therefore, each turning bar 14 is actuated by a motor member comprising, for example, a hydraulic jack 15 placed under the set 7 of rollers. In the upper working position, each turning bar 14 is disposed in the path of corresponding packages 2 to turn the latter through a right angle on the set 7 of rollers. In that way, by the selective action of the turning bar 14, it is possible to form at least two parallel longitudinal rows of packages 2 in which the packages 2 of one row are turned perpendicularly to those of the other rows.

After having been distributed by the distributing device and possibly turned by the turning device, the packages 2 disposed along three parallel lines and displaced on the set 7 of rollers are stopped by a first horizontal transverse bar 16 so as to be transversely aligned. In fact, there are always two first horizontal transverse bars 16 parallel to one another. The end of the two first transverse bars 16 are mounted respectively on two first lateral endless drive chains 17, disposed on either side of the set 7 of rollers, driven in synchronism by an electrical motor 18 through transmission means 19.

The first two transverse bars 16 are equidistant from one another along the first endless chains 17. In that way, when one first transverse bar 16 is located above the set 7 of rollers and at the end of the latter to stop packages 2, the other first transverse bar 16 is located under said set 7 and at the beginning thereof, out of the path of said packages 2. When the three rows of packages 2 are stopped by the first transverse bar 16 and are thus transversely aligned on the set 7 of rollers, the electrical motor 18 runs and displaces the first endless chain 17 according to a counter-clockwise motion, so as to bring said first transverse bar 16 back under said set 7, to raise the corresponding other first bar 16 above said set 7 and to cause it to serve as a pushing member providing for the subsequent forward movement of packages 2. In fact, the first transverse bar 16, the first endless chain 17 the electrical motor 18 and the transmission means 19 form together a first mechanical raker cooperating with the input transporter 4 and the distributing and return devices, and playing the dual function comprising on the one hand stopping and aligning transversely the rows of packages 2 on the said set 7 of rollers and on the other hand pushing said packages 2 in the forward direction to remove them from said set 7.

Thus, when three rows of packages 2 are formed against the first transverse bar 16, the latter passes under the said set 7 of rollers, whereas the other transverse bar 16 disposed until now under said set 7 is brought above the latter and then pushes simultaneously forward the three rows of packages 2. The first two transverse bars 16 turn a half-circle so as to be stopped each in the position previously taken by the other.

At the outlet of the said set 7 of rollers, the two end rows of packages 2 are progressively and transversely brought back against the middle row by oblique guides 20 preferably with adjustable positioning.

The three rows of packages 2 pushed by the said set 7 of rollers are then fed to a fixed support plate 21 which is flat and horizontal. Under the level of the fixed support plate there is a movable and horizontal plate 22, alternately displaced in its plane to a position above the pallet 1. The movable support plate 22 is driven by an electrical motor 23 through transmission means 24.

The three rows of packages 2, thus pushed by the fixed support plate 21, are stopped at the end thereof by a second transverse horizontal bar 25. In fact, the device is provided with two second transverse bars 25 constantly parallel to one another. The ends of said two second transverse bars 25 are connected to two second lateral endless drive chains 26 placed on both sides of the fixed support plate 21 and above the latter as shown in FIG. 1. The second transverse bars 25 are constantly at equal distance from one another along the second endless chains 26. The second endless chains 26 are driven in synchronism by an electrical motor 27 through transmission means 28.

After the rows of packages have been stopped and aligned on the fixed support plate 21 by means of a second transverse bar 25, the electrical motor 27 starts and displaces the second endless chain 26 in a clockwise direction. In that way the second transverse bar 25 serving until that time as a stop means before the three rows of packages 2 is raised and disengaged from the path thereof while simultaneously the other second transverse bar 25 is lowered and brought behind said packages 2 so as to be able to push them forward and to cause them to slide on the fixed support 21. In that way, each second transverse bar 25 makes each time a half-circle in the clockwise direction so as to be placed into a position left by the other. Accordingly, the second transverse bar 25, the second endless chain 26, the electrical motor 27 and the transmission means 28 form together a second raker mechanism cooperating with the stacking section of rows of packages 2 on the pallet 1. It should be noted that each second transverse bar 25 goes downward at the front of the fixed support plate 21 according to a vertical trajectory perpendicular to the axis of the corresponding first transverse bar 16 in the position of front stop for the three rows of packages 2 displaced on said set 7 of rollers. This is to provide for the pushing, by the second transverse bar 25, of the three rows of packages 2 previously pushed by the first transverser bar 16 up to its said stop position. FIG. 3 illustrates this feature common to both mechanical rakers which cooperate to obtain a general continuous operation of the palletizing apparatus when changing the pallet 1.

During each displacement step of the second endless chains 26 and the second transverse bars 25, the movable support plate 22 is in its turn moved between a starting position location below the fixed support plate 22 and an opposite position located above the pallet 1 in working condition and vice-versa. In that way, as they are being pushed by the second transverse bar 25, the rows of packages 2 are progressively retaken by the movable support plate 22 in forward motion until they are in stacking position. The withdrawal in return of the movable support plate 22 toward its starting position permits the effective stacking of three rows of packages 2 which are on the other hand retained on the pallet 1 or on other rows of packages 2 already positioned on the pallet 1.

The rows of packages 2 are thus successively placed onto the pallet 1 carried by an elevator 29 among others comprising lifting chains 30 or the like, simultaneously controlled by winch 31 driven by an electrical motor 52.

The pallet 1 descends vertically and progressively as the rows of packages 2 are being loaded. In the lower position, the completely loaded pallet 1 rests on a discharge conveyor 33 with chains, controlled by an electrical motor 34 through transmission means 35. The discharge conveyor 33 operates jointly with an auxiliary conveyor 36 placed for example, in the same alignment, and at the same level below the said fixed support plate 21. The auxiliary conveyor 36 also driven or controlled by the electrical motor 34 carries a pallet 1 in reserve.

It should be noted that the part of the elevator 29 which carries the completely loaded pallet 1 goes further downwards than the discharge conveyor 33 and on both sides of the latter so as to be able to release said pallet 1 and its load. Accordingly after the completely loaded pallet 1 has been laid down onto the discharge conveyor 33, the electrical motor 34 starts running and provides for the simultaneously rotation of discharge conveyor 33 and the auxiliary conveyor 36 in a counter-clockwise direction. As a result thereof, the completely loaded pallet 1 is moved in forward direction up to parallel outlet conveyors 37 sloped forward whereas the pallet in reserve is brought onto the discharge conveyor 33 to be retaken by the elevator 29. The completely loaded pallet 1 descends for example by gravity onto the outlet conveyors 37.

The photoelectric cell 40 near the input conveyor 4 controls the distributing and return devices of the section of formation for rows of packages 2. For that purpose, the photoelectric cell transmits impulses to a programmed control means. In addition, the programmed control means controls the displacement of other conveyors for the packages 2, the said set of rollers, both mechanical rakers and the pallet elevator.

In the embodiment considered hereinabove, the palletizing apparatus is provided with two transverse bars 16 and two similar bars 25 alternately operating to stop the rows of packages 2 and to push them forward. The invention also covers a palletizing apparatus provided with one single transverse bar 16 and one single similar bar 25, playing their respective double functions.

It should be noted that the invention is not exclusively limited to the embodiment shown and that obvious modifications may be made which fall within the scope of the following claims.

What is claimed is:

1. Palletizing apparatus serving to stack onto a pallet successive horizontal rows of packages such as packing cases, boxes or the like, said palletizing apparatus including an input section for packages comprising an input conveyor successively conveying packages in single file to a fixed point, a support section for the formation of packages into spaced rows comprising conveyor means including a set of rollers for receiving the packages from the input conveyor, and transversely extending bar means displaceable forwardly of the path of packages carried on said conveyor means and rearwardly away from this path, said bar means having the dual function of temporarily stopping the packages in a position close to the end of said conveyor means until the formation of a row and pushing the row or a following row of packages upon forward displacement of said bar means, and a section for stacking the rows of packages comprising an elevator for supporting a pallet and receiving in succession rows of packages displaced by said transverse bar means, the improvement comprising a distributing device including a horizontally extending bar disposed on said conveyor means perpendicular to the axes of said rollers adjacent said fixed point; support means extending between two of said rollers for supporting said horizontal bar and drive means for moving said support means and horizontal bar laterally across said conveyor means for pushing selected ones of said packages over said conveyor means transversely with respect to the path of movement created by said conveyor means while said conveyor means continues to operate so as to dispose the packages in at least two spaced parallel rows on said conveyor means; and a retractable turning device comprising a vertical bar extending above said set of rollers for engaging the corner of packages being conveyed on said set of rollers so as to turn said packages through right angles and thereby form at least two parallel rows of differently disposed packages.

2. The palletizing apparatus of claim 1 further comprising motor drive means connected to said vertical bar, said vertical bar extending between two rollers of said set of rollers for retraction between said two rollers by said motor drive means.

3. The palletizing apparatus of claim 1 wherein said stacking section comprises a fixed support plate receiving rows of packages pushed by said transverse bar means and a movable support plate horizontally disposed and movable between a position beneath said fixed support plate and a position above the top of said pallet, and second transverse bar means being movable with said movable support plate forwardly over said fixed support plate so as to move said packages from said fixed support plate to said movable support plate when said movable support plate is above said pallet, said transverse bar means movable to a position at the front of said fixed support plate so as to scrape the packages from said movable support plate when said movable support plate is moved to a position beneath said fixed support plate.

4. The palletizing apparatus of claim 2 further comprising first endless chain drive means for supporting said transverse bar means and second endless chain drive means for supporting said second transverse bar means for moving said transverse bar means and said second transverse bar means along the path of said packages.

5. The palletizing apparatus of claim 3 wherein said first endless chain drive means extend along the sides of said rollers and said second endless chain drive means extend along the sides of said fixed support plate, said first endless chain drive means being disposed above and below said set of rollers, said first endless chain means permitting forward movement of said transverse bar means above said set of rollers while moving said packages from said set of rollers to said fixed support plate and rearward movement of said transverse bar means below said set of rollers from said front to said rear, said second endless chain means being disposed above said fixed support plate so as to permit said second transverse bar means to move from front to rear and rear to front about said fixed support plate at different levels, said second transverse bar means engaging said packages at only one of said levels and moving perpendicular to said transverse bar means when moving from one of said levels to the other of said levels.

6. The palletizing apparatus of claim 1 further comprising control means including at least one photoelectric cell actuated in response to packages moving from said input conveyor for controlling the position of said retractable distributing device.

\* \* \* \* \*